UNITED STATES PATENT OFFICE.

HERMANN FRITZSCHE, OF BASEL, SWITZERLAND, ASSIGNOR TO SOCIETY OF CHEMICAL INDUSTRY IN BASLE, OF BASEL, SWITZERLAND.

AZO DYESTUFFS DYEING MORDANTED GOODS.

1,316,781. Specification of Letters Patent. Patented Sept. 23, 1919.

No Drawing. Application filed June 7, 1918. Serial No. 238,779.

*To all whom it may concern:*

Be it known that I, HERMANN FRITZSCHE, a citizen of the Swiss Republic, and resident of Basel, Switzerland, have invented new Azo Dyestuffs Dyeing Mordanted Goods, of which the following is a full, clear, and exact specification.

I have found that new azodyestuffs dyeing mordanted goods can be derived from the diazotation products of the arylamids, of the aminoöxyarylsulfonic acids containing the amino group in a position "ortho" relatively to the hydroxyl group and being eventually substituted in the arylamid radical by other substituents, as, for instance, amido-, hydroxyl-, sulfo- or carboxyl groups, that is to say correspond to the general formula

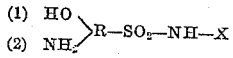

$$\begin{array}{l}(1)\ HO\\(2)\ NH_2\end{array}\Big\rangle R-SO_2-NH-X$$

wherein X and R stand for aryl-radicals, which may be further substituted.

The arylids of amino-orthoöxyarylsulfonic acids and their derivatives corresponding to the above formula can be obtained by acting on the chlorids of halogennitroarylsulfonic acids containing the nitro group in position "ortho" relatively to the halogen with arylamins or their nitro-, carboxy-, sulfo- or oxycarboxy-derivatives or the like, substituting a hydroxyl group for the halogen in the condensation products thus obtained by acting thereupon with alkalis, and by reducing the resulting nitroöxy bodies.

The preparation of the parent materials employed for the production of the new azodyestuffs is illustrated by the following Examples 1 and 2 and their transformation into azodyestuffs by the following Examples 3 to 5.

*Example 1. Preparation of the 1-oxy-2-aminobenzene-4-sulfanilid.*

93 gr. of anilin are dissolved in 100 ccm. of hydrochloric acid of 30 per cent. and 1000 ccm. of water and in the solution are poured in the course of 1 hour, at 50 to 60° C., 255 gr. of 1 chloro-2-nitrobenzene-sulfochlorid. The liberated hydrochloric acid is neutralized by addition of chalk in such a quantity that no acid reaction occurs. After 2 hours the solution, in which the condensation product is suspended in the form of a thick oil, is heated to boiling and acidified with hydrochloric acid in order to eliminate the chalk in excess and the liquid is decanted from the oil which concretes quickly. By saponification with soda lye and reduction with sodium sulfid according to the method specified in Example 1, the 1-oxy-2-aminobenzene-4-sulfanilid is obtained and can be isolated easily in the form of its hydrochlorid.

In this example the anilin can be replaced by equivalent quantities of its alkyl-, carboxyl-, sulfo- and hydroxy-derivatives and thus the corresponding methylphenylamid, sulfophenylamid, oxycarboxyphenylamid, etc., may be obtained.

*Example 2. Preparation of the 4-aminophenylamid of the 2-amino-1-oxybenzene-4-sulfonic acid.*

138 gr. of paranitranilin are suspended in 2000 ccm. of water and in the course of 1 hour 255 gr. of 1-chloro-2-nitrobenzene-4-sulfochlorid are added at 80 to 95° C., the hereby produced hydrochloric acid being neutralized by adding soda lye. After heating for 4 hours the mass is acidified with hydrochloric acid and filtered. The residue is saponified by boiling it for 4 hours with an aqueous solution of 120 gr. of soda lye, whereafter the saponified condensation product is precipitated by adding hydrochloric acid. In order to reduce both of the nitro groups the product is treated with sodium sulfid. From the hydrochloric solution the 4-aminophenylamid of the 2-amino-1-oxybenzene-4-sulfonic acid is precipitated by addition of sodium carbonate.

*Example 3.*

26.3 parts of the anilid of 2-amido-1-oxybenzene-4-sulfonic acid (prepared according to Example 1) are diazotized with 27 parts of hydrochloric acid and 6.9 parts of sodium nitrite at 0° C. The greenish yellow diazo compound separated is added to a suspension of 35 parts of 1.8-dioxy-napthalene-3.6-disulfonic acid and 25 parts of calcium hydroxid in about 500 parts of water. After 12 hours the mass is first acidified with dilute sulfuric acid and afterward made weakly alkaline with sodium carbonate and the solution of dyestuff is separated from calcium sulfate by filtration. From its solution the dyestuff is separated by neutralization and precipitation with common salt. It corresponds to the formula

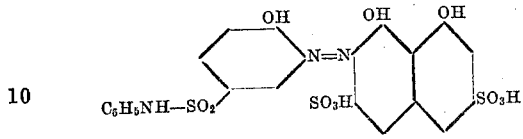

In the form of its sodium salt, the dyestuff is a dark violet powder soluble in water and in concentrated sulfuric acid to red-violet solutions and dyes wool in an acid bath Bordeaux-red tints turning on subsequent chromating to a blue fast to washing, fulling, potting and to light.

*Example 4.*

32.3 parts of 4-oxy-3-carboxyphenylamid of the 2-amino-1-oxybenzene-4-sulfonic acid are diazotized in the usual manner and the difficultly soluble yellow-diazo compound obtained is added to a solution of 15 parts of betanaphthol in 13 parts of soda lye of 30 per cent., made alkaline with sodium carbonate. The dyestuff is isolated in the usual manner.

Its sodium salt constitutes a dark red powder dissolving in water and in concentrated sulfuric acid to red solutions and dyeing wool in an acid bath Bordeaux-red tints turning by subsequent chromating to a violet very fast to washing, fulling and potting and to light.

*Example 5.*

27.7 parts of the 4-aminophenyl-amid of the 2-amino-1-oxybenzene-4-sulfonic acid (prepared according to Example 3) are tetrazotized with 50 parts of hydrochloric acid of 30 per cent. and 14.4 parts of sodium nitrite and the resulting solution of tetrazo body is poured into a solution of 25.4 parts of 1-sulfophenyl-3-methyl-5-pyrazolone in 500 parts of water and 20 parts of crystalized sodium acetate. After 2 hours the intermediate product formed is stirred into an aqueous solution of 14.5 kg. betanapthol and 60 kg. of sodium carbonate, made alkaline with soda lye. After a certain time the dyestuff is separated in the usual manner.

The sodium salt of the dyestuff constitutes a brown powder, dissolving in water with a brown coloration and in concentrated sulfuric acid with a red-brown coloration and dyeing wool in an acid bath yellow-brown tints becoming fast to washing and to light by subsequent coppering and turning on subsequent chromating to a dark brown very fast to washing, fulling and potting and to light.

What I claim is:

1. As new products the herein described azodyestuffs dyeing on mordants, derived from the product of diazotation of the bodies corresponding to the formula

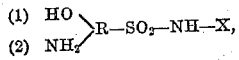

wherein X and R stand for aryl radicals which may be further substituted, the said dyestuffs being in a dry state yellow to dark colored powders, which dissolve in water and concentrated sulfuric acid with yellow to violet colorations, and dye wool in an acid bath yellow to blue-violet tints turning on subsequent coppering to greenish-yellow to blue tints fast to washing and to light and on subsequent chromating to yellow to black tints fast to washing, fulling, potting and light.

2. As new products, the herein described azodyestuffs dyeing on mordants, derived from the diazoderivatives of aminoörthooxyarylsulfoarylamids and oxyderivatives of napthalene able to combine with a diazo body, the said dyestuffs constituting in a dry state red-brown to dark colored powders, which dissolve in water with brown to violet colorations and in concentrated sulfuric acid with orange to violet colorations and dye wool in an acid bath red brown to Bordeaux red tints turning on subsequent chromating to violet-brown to blue tints fast to washing, fulling, potting and light.

3. As new product, the herein described azodyestuff dyeing on mordants and, corresponding to the formula

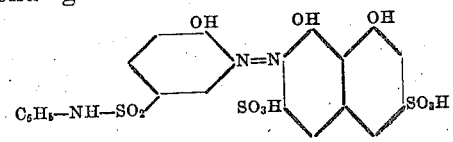

and resulting from the combination of the diazoderivative of 1-oxy-2-aminobenzene-4-sulfanilid with 1-8-dioxynaphthalene-3-6-disulfonic acid, the said dyestuff constituting in a dry state a dark violet powder dissolving in water and in concentrated sulfuric acid to red-violet solutions and dye wool in an acid bath Bordeaux-red tints turning on subsequent chromating to blue tints fast to washing, fulling, potting and light.

In witness whereof I have hereunto signed my name this eighth day of May, 1918, in the presence of two subscribing witnesses.

HERMANN FRITZSCHE.

Witnesses:
 WALTER E. BUNDY,
 ARMAND RETTEY.